United States Patent Office 3,446,726
Patented May 27, 1969

3,446,726
HETEROGENEOUS SELECTIVE MEMBRANES
Ernö Pungor, Budapest, Jenö Havas, Balatonfuzfo, Klára Toth, Veszprem, and Géza Madarász, Balatonfuzfo, Hungary, assignors to Metrimpex Magyar Muszeripari Kulkereskedelmi Vallalat, Budapest, Hungary
No Drawing. Filed July 21, 1964, Ser. No. 384,264
Claims priority, application Hungary, July 22, 1963, PU–133
Int. Cl. B01k 3/10
U.S. Cl. 204—296                                    3 Claims

ABSTRACT OF THE DISCLOSURE

Ion selective membranes are comprised of silicone rubber with particles of an active material dispersed therein. The active material has a size range of 1 to 50 microns and is present in an amount such that the particles are close enough together for pearl-type electrical conduction to occur.

---

The invention relates to heterogeneous selective membranes and to the preparation of the same.

In the course of technical development, in the analysis of a number of various substances it is necessary to carry out the determination of one component in the presence of a number of further ones, or to separate one component from the others by means of dialysis or ion-exchange.

In chemical analysis, the sample to be tested is dissolved in a suitable solvent (e.g. water, organic solvents) and the analytical procedures are carried out on the dissolved material. In the course of the development of electrochemical analysis and of the titration of components present in a liquid phase, ever-increasing attention is being paid to the development of suitable membranes. These membranes may be used within a broad field of application, e.g. for the indication of the end-point in potentiometric titrations, for the selective determination of ionic activities, for ion-exchange and for the elimination of given kinds of ions from solutions. In order to meet the requirement brought about by the wide field of applicability, it is necessary to produce membranes possessing preferable qualities from a mechanical point of view as well. The membranes hitherto known can be divided into two groups: homogeneous membranes, consisting entirely of the active material developing the membrane potential; and heterogeneous membranes, in the case of which the active component is dispersed in a suitable carrier phase, and the mechanism of conduction is that of pearl conduction. In the case of the latter, the surfaces of the individual particles are in contact with each other and electrical conductivity is brought about by this contact.

It has been tried to use homogeneous membranes prepared from precipitates for the determination of ionic activity ($p_{Cx}$) in solution. Homogeneous membranes are, however, fragile in a high degree, i.e. they possess a very low mechanical strength and consequently their application is restricted for scientific purposes only. Tendeloo and Krips (Receuil Trav. Chim. Pays-Bas 76, 703–711, 946–948, etc.) have used a calcium oxalate precipitate embedded in paraffine, i.e. a heterogeneous membrane for the determination of $p_{Cx}$. Pungor and Rokosinyi have prepared a paraffine-carrier phase silver iodide precipitate membrane for the determination of the activity of silver and iodide ions; further, they succeeded in following variations in the ionic activity of iodide ions in the presence of chloride and bromide by means of the above mentioned heterogeneous membrane (Acta Chim. Acad. Sci., Hung. 27, 1961, p. 63). These membranes are, however, of poor mechanical strength, further their preparation is complicated and consequently they are not suited for scientific or industrial series determinations.

It has been found necessary to prepare membranes on an industrial scale that are suitable for the direct potentiometric determination of ions present in solutions in the course of electrochemical tests, further for the separation and exchange of ions; at the same time, these membranes should possess a favourable mechanical strength and in addition, they should be cation- or anion-selective and generally applicable. It has been found that the above-mentioned objects can be achieved by the present invention.

The heterogeneous selective membranes prepared in accordance with the present invention and suitable for the direct potentiometric determination of the quantity of ions present in solution, for ion-exchange and for the separation of ions, contain an active material of suitable particle size dispersed in a silicone-subber carrier phase in such a proportion that the original mechanical properties of silicone-rubber are unchanged. The particle size of the active material is such that the conditions for pearl-type conduction and also for the attainment of chemical equilibria at the two boundary layers are realised.

In order to prepare heterogeneous selective membranes in accordance with the present invention and suitable for the direct potentiometric determination of the quantity of ions present in solution, for ion-exchange and for the separation of ions, an active material of suitable particle size as regards pearl-type conduction and attainment of chemical equilibria at the two boundary-layers is dispersed in a polymer suitable for the preparation of silicone rubber as carrier phase in such a quantity that the original mechanical properties of the silicone rubber are unchanged. To the polymeric mixture thus obtained, catalysts and curing agents usually employed in the preparation of silicone rubber are added and the membrane layer is shaped by curing at ambient temperature.

To the silicone rubber carrier phase active materials such as inorganic or organic precitates, metal chelate complexes, ion exchange resins or molecular sieves are preferably added whereas the active material dispersed in the carrier phase acts at the same time as a filler for the silicone rubber as well. The suitable particle size of the inorganic or organic precipitate or metal chelate complex as regards pearl-type conduction is governed by the parameters of precipitation. However, if active materials composed of an ion exchange resin or a molecular sieve are used, the control of the particle size is achieved by the use of a suitable milling technique. The particle size of 1 to 50 microns of the active material dispersed in the carrier phase has been found preferable in practice. As a silicone rubber polymer, preferably a polysiloxane of the molecular weight 15,000 to 300,000 and containing methyl-, phenyl-, vinyl- or other organic substituents and —SiOH end groups is applied. It is possible to add solvents to the polymeric mixture containing the active material, and in this case the method of processing in order to obtain membrane layers can be controlled by the quantity of the solvents used. The membrane layers prepared of the polymeric mixture can be formed by pouring, calendering or rolling. In order to disperse the precipitate in the polysiloxane a kneader or roller-mill, and in order to homogenize the mixture a mixer or a rubber roller mill, can be used. The usual curing agents and catalysts are added to the homogenized mixture and the film-formation or curing is carried out at ambient or elevated temperatures.

Advantages of membranes prepared according to the present invention are the following:

(1) In water they show but a moderate swelling (1 to 10 percent) and consequently they can more preferably be employed for the determination of electrode-potentials as compared to other membrane electrodes hitherto known.

(2) Their mechanical strength and elasticity is equal to those of the original silicone rubber film, and consequently they can advantageously be used; their elasticity is 300 to 500 percent.

(3) They show a fair temperature resistance up to 270° C. The temperature of application depends only on the properties of the active material dispersed in the carrier phase.

(4) A property of paramount importance from an electro-chemical point of view is their high capacity.

(5) Their preparation is extremely simple and easily reproduceable. They can be prepared in any desired thickness or form.

Membranes prepared according to the present invention are very well suited for the determination of membrane potential by means of the usual techniques, e.g. by the use of two reference electrodes. The possibility of the suitable performance of the desired measurements or procedures is present not only in the case of aqueous solutions but in all organic solvents as well, in which the precipitate dispersed in the carrier phase is insoluble and in which—with the use of a solvent of a given dielectric constant—ionisation takes place. In addition to membrane potential determinations, the heterogeneous membranes can be used for ion-exchange processes and dialysis as well. E.g., by the use of heterogeneous membranes inorganic electrolyte contaminations can be separated from organic material, free organic bases can be liberated from the salts of said bases formed with inorganic acids.

The examples given below refer to the preparation and application of heterogeneous membranes according to the present invention; however, without limiting the scope of invention to the given examples.

EXAMPLE 1

Preparation of a heterogeneous membrane suited for selective determination of iodide activity by means of calendering.

At first, the silver iodide (AgI) precipitate suitable for the determination of iodide activity is prepared.

To 100 ml. N/100 silver nitrate 10 drops of a 0.2 percent p-ethoxychrysoidine solution and a 50 percent excess of potassium iodide—in the form of an aqueous N/10 solution—are added. Precipitation is carried out at room temperature with stirring. The precipitate formed is centrifuged and washed three times with distilled water in a room protected from direct sunshine. The washed precipitate is collected upon a filter paper and is dried in a drying cabinet at 80° C. to constant weight. The dried AgI precipitate is applied as active material in the preparation of heterogenous membranes.

In order to form a carrier phase for the heterogeneous membrane dimethylpolysiloxane is applied. 30 parts by weight of a precipitate prepared according to the above are dispersed by mixing in 70 parts by weight of dimethyl polysiloxane (Silopren K 100, Farbenfabriken Bayer) until a statistically homogeneous suspension is obtained. The curing agent and catalyst mixture is prepared by mixing 1 part by weight dibutyl-stannic-dilaurate and 2 parts by weight hexaethoxy siloxane. The curing agent and catalyst is added to the dimethyl polysiloxane containing the precipitate in such a proportion as to ensure perfect curing and the curable mixture thus obtained is calendered between two plastic sheets to the desired thickness. Curing of the mixture—i.e. completion of the reaction—is effected within about 10 minutes. A piece of a size corresponding to the desired application of the membrane is cut from the elastic film prepared according to the above and cemented to a glass tube by means of silicone cement.

The silver iodide membrane prepared according to the above can be employed for the determination of iodide-activity by pouring a $10^{-3}$ M potassium iodide solution into the supporting glass tube and in order to form a galvanic contact a calomel-half-cell is placed in the solution. The membrane electrode thus obtained indicates the activity of iodide ions present in the solution when measured against a reference electrode. An equilibrium state is reached within a few minutes, the measuring accuracy is ±5 mv. Membrane electrodes prepared according to the above respond to any changes in iodide or silver ion-activity with a change in membrane potential. Measuring range: $10^{-1}$ to $10^{-7}$ M.

The selectivity of the membrane electrode can be characterized by the fact that it can furnish a value characteristic of the activity of the ions to be measured even in the presence of some other electrolyte of high concentration. As is apparent from the data summarized in Tables I and II the iodide activity is changed in the presence of other electrolytes but the measured values are in good agreement with theory even in such cases. Similarly, it can be seen from the Tables I and II that the accuracy of silicone rubber carrier phase heterogeneous membrane electrodes is equal, or even higher than that of membranes containing paraffine carrier phase.

TABLE I.—IODIDE-ACTIVITY VALUES MEASURED IN THE PRESENCE OF $10^{-1}$ M POTASSIUM CHLORIDE

| $p^I$ calculated | $p^I$ measured | $\Delta p^I$ |
| --- | --- | --- |
| 1.12 | 1.0 | −0.12 |
| 2.12 | 2.05 | −0.07 |
| 3.12 | 3.07 | −0.05 |
| 4.12 | 4.05 | −0.07 |
| 5.12 | 5.20 | +0.08 |
| 6.12 | 6.18 | +0.06 |

TABLE II.—IODIDE-ACTIVITY VALUES MEASURED IN THE PRESENCE OF $10^{-1}$ M SODIUM-SULPHATE

| $p^I$ calculated | $p^I$ measured | $\Delta p^I$ |
| --- | --- | --- |
| 1.35 | 1.17 | −0.18 |
| 2.35 | 2.08 | −0.27 |
| 3.35 | 3.18 | −0.17 |
| 4.35 | 4.40 | +0.05 |
| 5.35 | 5.45 | +0.10 |

EXAMPLE 2

Preparation of a heterogeneous membrane containing barium sulphate active material.

To a N/100 barium chloride solution ammonium sulphate in the form of 2 N solution is added in a 50 percent excess at a pH value of 2, at ambient temperature, with stirring. 30 parts by weight of the barium sulphate precipitate—processed and dried in the usual manner—are dispersed in 70 parts by weight of silicone rubber polymer and the mixture is processed as described in Example 1. The heterogeneous membrane thus prepared has been used for the determination of sulphate ion activity and the results obtained are summarized in Table III.

TABLE III.—DETERMINATION OF SULPHATE ION ACTIVITY

| Measured $p_{SO_4}$ | Calculated $p_{SO_4}$ | $\Delta p_{SO_4}$ |
| --- | --- | --- |
| 1.24 | 1.34 | +0.10 |
| 2.25 | 2.14 | +0.11 |
| 3.05 | 3.05 | 0 |
| 4.10 | 4.01 | +0.09 |
| 5.10 | 5.00 | +0.10 |
| 5.60 | 6.00 | −0.40 |

What we claim is:

1. A heterogeneous electrically conductive ion selective membrane comprising in membrane form and shape an active ionic material selected from the group consisting of silver iodide and barium sulphate and capable of pearl-type electrical conduction dispersed in a silicone rubber, said material being in finely divided form with a particle size of about 1–50 microns and the dispersed particles being in pearl-type electrical contact with each other.

2. Membranes as claimed in claim 1, said active material being silver iodide.

3. Membranes as claimed in claim 1, said active material being barium sulphate.

References Cited

UNITED STATES PATENTS

| 2,704,748 | 3/1955 | Pfeifer | 260—37 |
| 3,231,527 | 1/1966 | Ceyzeriat | 260—18 |

FOREIGN PATENTS 1,038,191  9/1958  Germany.

WILLIAM H. SHORT, *Primary Examiner.*

M. GOLDSTEIN, *Assistant Examiner.*

U.S. Cl. X.R.

204—180, 195; 260—2.1, 2.2